United States Patent [19]

Kjøller

[11] 4,240,136
[45] Dec. 16, 1980

[54] APPARATUS FOR INSERTING INSTRUCTIONS IN A CONTROL SEQUENCE IN A STORED PROGRAM CONTROLLED TELECOMMUNICATION SYSTEM

[75] Inventor: Hans O. S. Kjøller, Västerhaninge, Sweden

[73] Assignee: Telefonaktiebolaget L M Ericsson, Stockholm, Sweden

[21] Appl. No.: 876,881

[22] Filed: Feb. 13, 1978

[30] Foreign Application Priority Data

Feb. 28, 1977 [SE] Sweden ............................ 7702208

[51] Int. Cl.³ .......................... G06F 9/32; G06F 13/00
[52] U.S. Cl. ............................................... 364/200
[58] Field of Search ... 364/200 MS File, 900 MS File

[56] References Cited

U.S. PATENT DOCUMENTS

| | | | |
|---|---|---|---|
| 3,130,299 | 4/1964 | Rathbun et al. | 364/200 |
| 3,415,981 | 12/1968 | Smith et al. | 364/200 X |
| 3,444,527 | 5/1969 | Hartley et al. | 364/200 |
| 3,475,732 | 10/1969 | Avsan et al. | 364/200 |
| 3,480,917 | 11/1969 | Day | 364/200 |
| 3,559,183 | 1/1971 | Sussenguth | 364/200 |
| 3,562,713 | 2/1971 | Packard | 364/200 |
| 3,636,523 | 1/1972 | De Sandre et al. | 364/200 |
| 3,660,825 | 5/1972 | De Sandre | 364/200 |
| 3,696,340 | 10/1972 | Matsushita et al. | 364/200 |
| 4,057,850 | 11/1977 | Kaneda et al. | 364/200 |

*Primary Examiner*—Melvin B. Chapnick
*Attorney, Agent, or Firm*—Hane, Roberts, Spiecens & Cohen

[57] ABSTRACT

Apparatus wherein a sequence of control instructions and a number of insertion instructions are stored in memory element groups of a memory accessed by associated addresses in a stored program controlled telecommunication system. The sequence is read and decoded in response to successive address increments. In order to insert one of the insertion instructions between the control instructions, the sequence includes an insertion step or reference indicating a first address assigned to the insertion instruction and a second address assigned to one of the control instructions. Upon decoding the insertion reference, a logical buffering unit is used in order to replace the successive address incrementing by such address transfers that the control instruction accessed by the second address is decoded subsequent to the insertion instruction which itself is decoded after the insertion reference.

4 Claims, 8 Drawing Figures

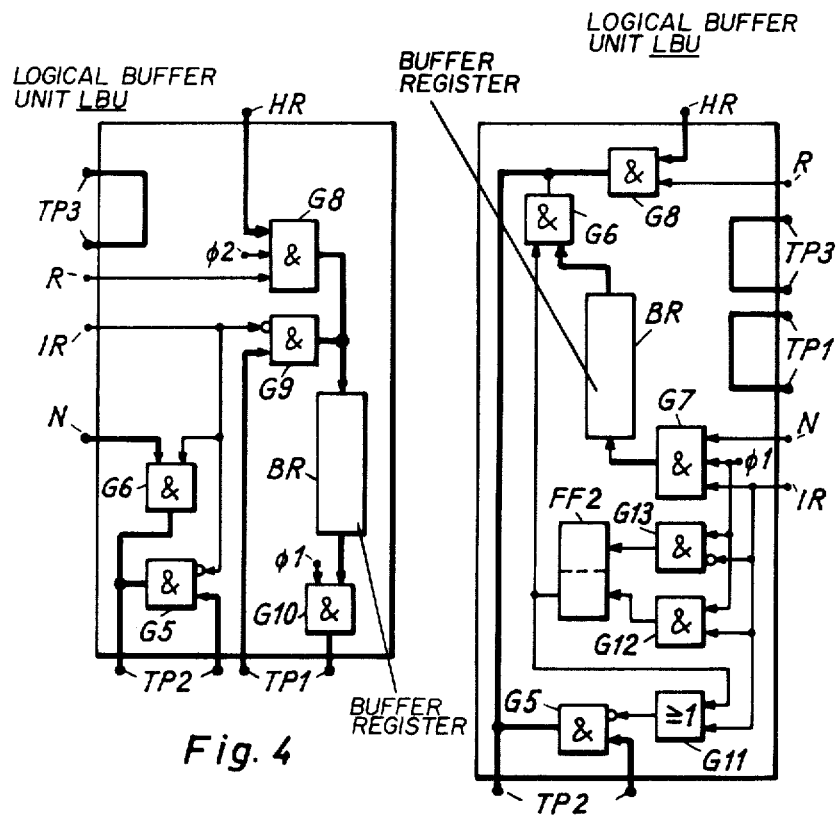
Fig. 4
Fig. 5
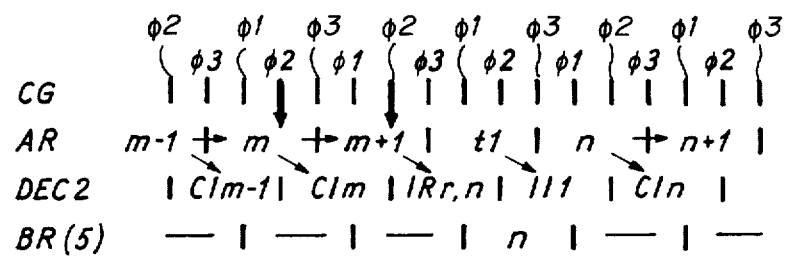
Fig. 8

APPARATUS FOR INSERTING INSTRUCTIONS IN A CONTROL SEQUENCE IN A STORED PROGRAM CONTROLLED TELECOMMUNICATION SYSTEM

BACKGROUND OF THE INVENTION

The present invention refers to an arrangement in a stored program controlled telecommunication equipment for inserting one of a number of insertion instructions in a sequence of control instructions to control the equipment. The insertion instructions and the control instructions are stored in memory element groups of a random-access-memory. The memory includes addressing/decoding circuits in order to address, in a known manner, by means of address numbers and timing pulses generated by a clock generator, the memory element groups for reading. In order to decode the read instructions, the address numbers are successively stepped concurrently with the instruction decoding.

A stored program controlled telecommunication equipment has, as a complement to the actual telecommunication equipment, a computer, the program memory of which is used for the real-time control of the telecommunication equipment. Control instructions are stored in the program memory. By reading, decoding and executing the control instructions in a certain order, i.e. by constructing and step-by-step executing a computer program, control functions are obtained and executed constituting the mentioned real-time control. An address number belongs to each instruction being stored in a memory element group, and the processor of the computer reads the instruction by means of the associated address number. Therefore the mentioned order is easily obtained if successively increasing address numbers are allotted to such instructions which are to be successively executed. However such instruction sequences use jump instructions and sub programs to achieve optional modifications of the actual instruction sequence and the order of the sequence. A more detailed explanation of the stored program control is not necessary for the present invention, it is only important to remember that each added instruction or each change of the order in which the control instructions are executed, results in changes in the state of the system or the mode of control.

In a stored program controlled telecommunication equipment the computer and its program are not only used for the execution of the actual teletechnical control functions but also to perform installation, maintenance or testing functions. With such applications there is often a need to modify a general instruction sequence by inserting at determined first sequence points only one of a number of extra instructions, hereinafter called insertion instructions, and by returning to the general sequence at determined other sequence points, which are ordinarily completely independent of the mentioned first sequence points. The insertion instructions are associated with addresses which have no relation at all to the addresses of the general sequence. Usually the insertion instructions are assembled in a table which is stored in a part of the program memory.

The need to now and then insert one single instruction can be explained by the following example: After a temporary disturbance which has been localized to a function block of the telecommunication equipment, the serviceability of this function block has to be examined in detail by means of a testing program designed for this purpose. As it happens, one of the devices of the function block is working questionably if it is fed with normal drive voltage. By means of an insertion instruction the device is fed with an increased drive voltage and the continued testing function will show if the device is working as it should. This example shows that an insertion instruction as well as an arbitrary control instruction is used to perform a planned change of the state of the system.

A trivial method for achieving the execution of insertion instructions is to provide the general instruction sequence with so called blind instructions which, when there is a need, are replaced by insertion instructions. Such a rigid way of modifying demands a writable program memory. Usually the program memory has memory elements whose contents cannot be changed (read-only type). Furthermore, the mentioned trivial method would always result in that the general sequence is resumed due to the uninfluenced order immediately after the insertion instruction. In reality it is desirable to be able to freely decide whether a number of general control instructions shall be jumped over or be repeated due to the instruction insertion.

Another method for achieving instruction insertions is to treat each insertion instruction as a sub program which is executed for example with the aid of the U.S. Pat. No. 3,292,155 or the U.S. Pat. No. 3,571,804 each of which deals with a re-entry point variation. In the first case each sub program comprises a return instruction which is individual for this sub program. In the second case the re-entry point, which heretofore has been called the second sequence point, is individually associated with its jump point, previously indicated as the first sequence point, independently of which a number of possible sub programs is inserted. Both variants have that disadvantage in common that each sub program is finished with an instruction which is ineffective for the real-time control of the system and by which is indicated, in the first case, the actual re-entry point and, in the second case, that the sub program is ended and that a stored return address is to be used for resuming the general instruction sequence. As long as it is a question of a sub program comprising a great number of instructions, the mentioned ineffective instruction at the end of the sub program has no practical meaning. But if each sub program consists of just one insertion instruction, as in the present case, the mentioned ineffective instructions would demand a memory capacity which is as large as the one required by the effective insertion instructions. Furthermore there would be considerable loss of time for the execution of the program.

BRIEF DESCRIPTION OF THE DRAWING

The present invention includes an instruction insertion arrangement by means of which the mentioned disadvantages are avoided and will be more fully described by means of the accompanying drawing, wherein:

FIG. 4 shows a further embodiment of the logical buffering unit of FIG. 2;

FIG. 5 shows a still further embodiment of the logical buffering unit of FIG. 2; and FIGS. 6 to 8 show time diagrams of the addressing/decoding process in dependence on the particular embodiment of the logical buffering unit.

DESCRIPTION OF THE PREFERRED EMBODIMENTS

Figure 1:
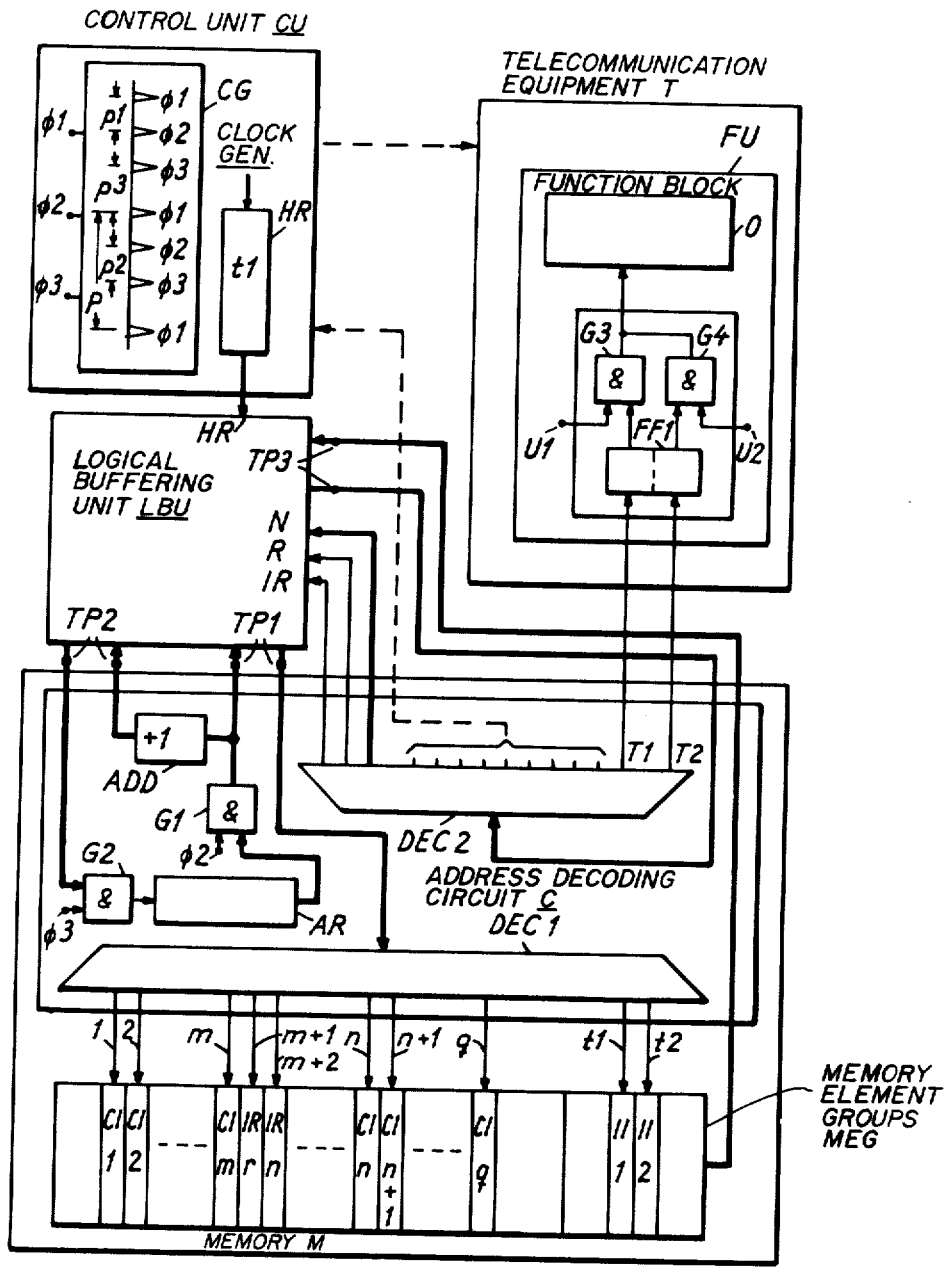
FIG. 1 shows a stored program controlled telecommunication equipment including as the main part of the insertion arrangement a logical buffering unit.

In FIG. 1 a telecommunication equipment T is controlled by means of a control unit CU having a clock generator CG and by means of a word organized memory M. The clock generator CG generates three synchronous pulse series which are mutually phase displaced. Each of these pulse series activates an output $\phi 1$, $\phi 2$ or $\phi 3$. Clock pulse periods are obtained between two successive pulses in one of these pulse series. The clock pulse periods determine the working cycles of the memory. The block of FIG. 1 symbolizing the clock generator includes a time diagram showing a clock pulse period P and different phase displacements p1 to p3 which are chosen with regard to the reaction times of the memory and by means of which time saving overlappings within the working cycles is achieved. The mentioned memory M is of a completely conventional random-access type and includes by groups accessable memory elements MEG and addressing/decoding circuits C connected to the mentioned clock generator. The operating method of such a memory is known for a long time and can be studied in each elementary book about computers, for example "Digital Computer Basics, Bureau of Naval Personnel, Navy Training Course, Navpers 10088" which was published in 1968.

The memory M shown in FIG. 1 is provided with three terminal pairs TP1 to TP3 which are connected to corresponding terminal pairs in a logical buffering unit LBU, the working method of which will be described below with the aid of four embodiments shown in the FIGS. 2 to 5. If it is assumed that the mentioned terminal pairs are short-circuited sequentially as is the case according to FIG. 5 as long as a gate device G5 is activated and if it is also assumed that an address register AR contains an address number m at the activation of the output $\phi 2$ of the clock generator, the working method of the memory can be summarized in the following way.

Through a gate device G1 being controlled by the output $\phi 2$ and through the terminal pair TP1, the address number m is transferred to a first decoder DEC1. Furthermore, the address number m is transferred via the mentioned gate device G1 to a +1-adder ADD, the output of which consequently emits the number m+1. The memory element group accessed by means of the address number m stores a control instruction CIm, which is transferred through the terminal pair TP3 to a second decoder DEC2. Depending on the received binary word selected outputs of the second decoder are activated. According to FIG. 1, the second decoder is connected to the logical buffering unit LBU and is connected to the telecommunication equipment T either directly or through the mentioned control unit CU. Via the terminal pairs TP2 and a gate device G2 which is controlled by the output $\phi 3$ of the clock generator CG, the mentioned number m+1 is transferred from the +1-adder ADD to the address register AR. In this known way to overlap the decoding/addressing processes, the words being stored in the memory are successively decoded. These words comprise the control instructions CI of the telecommunication equipment. A time diagram according to FIG. 8 shows how, during a clock pulse period between two especially marked pulses from the output $\phi 2$, the second decoder DEC2 decodes the control instruction CIm from the memory element group having the address number m and how the contents of the address register AR is stepped from m to m+1 at the pulse which during the marked period is obtained from the output $\phi 3$. The pulse series being emitted from the output $\phi 1$ of the clock generator is not used for the mentioned known overlapping principle.

FIG. 1 shows memory element groups MEG associated with successively increasing address numbers 1, 2 . . . m, m+1, m+2 . . . n, n+1 . . . q. It is assumed that these memory element groups contain an instruction sequence to perform a test of a function block FU in the telecommunication equipment. Furthermore, FIG. 1 shows memory element groups, associated with address numbers t1, t2, to store insertion instructions II1, II2 which are included in an instruction table. While the control instructions of the sequence CI normally are decoded in the order defined by means of the +1-adder ADD, there are no functional relations between the insertion instructions of the table, which are intended to be inserted one at a time between normally decoded sequence parts. The mentioned second decoder DEC2 is provided with outputs T1 and T2 which are activated due to a received insertion instruction II1 and II2, respectively, and which are connected to a first flip-flop FF1 of a voltage switch belonging to the mentioned function block FU. The voltage switch comprises two gates G3 and G4 for feeding a device O with a voltage U1 and a voltage U2 respectively in dependence on the state of the mentioned first flip-flop. Consequently FIG. 1 illustrates the above-mentioned example, i.e. to now and then carry out planned changes of the system state by means of insertion instructions. FIG. 1 shows two sequence parts of which the first one comprises the control instructions CI1 to CIm and the second one comprises the control instructions CIn to CIq. An insertion reference IR is accessed by means of the mentioned +1-adder ADD after the first sequence part. This insertion reference IR comprises a first address a1=r, which leads to the insertion instruction in question, and a second address a2=n, which leads to the first control instruction CIn in the mentioned second instruction sequence part. If the first address of the insertion reference should be equivalent to the address of the insertion instruction in question, for example a1=t1, only this insertion instruction, for example II1, can be inserted. If there should be a wish to insert, by means of the same insertion reference, another insertion instruction, for example II2, a rewriting of the mentioned first address is necessary according to such a known method called "direct addressing", so that for example a1=t2. It should be impossible to use a read-only memory. However, such memory write operations are avoided by means of another known addressing method being called "indirect addressing". Below it is assumed that the indirect addressing is used to obtain the address of the insertion instruction in question. Consequently the first address of the insertion reference is constituted by a constant "help" address r which belongs to a help register HR of the control unit CU and by means of which according to FIG. 1 an output R of the second decoder DEC2 is activated. It is assumed that the help register contains the address number t1 which was transferred thereto by means of one of the control instructions in the first sequence part. Below, as the second address of the insertion reference, the mentioned address number n belonging to the second sequence part is directly chosen. According to FIG. 1 it is chosen that m<n, something which is not necessary, however. When m>n, a repetition of the insertion reference and also of at least a part of the first sequence part is obtained. Naturally, the indirect addressing could have been used also here in order to avoid writing operations in the memory if the second sequence part is to be modified, for example, due to the actual insertion instruction. According to FIG. 1 the insertion reference is stored in memory element groups with associated address numbers m+1 and m+2. Upon decoding the memory element group with the address m+1 and m+2, respectively, an output IR, in addition to the mentioned output R, and the output IR, in addition to outputs N, on which the address number n is obtained unchanged, respectively, are activated in the second decoder DEC2. Such an insertion reference with two associated addresses is used if the mentioned logical buffering unit is according to the embodiments of FIGS. 2 and 3. According to a second variant not being shown in FIG. 1 the insertion reference IRr,n is stored in one single memory element group associated with the address m+1. This second variant leading to a simultaneous activation of the mentioned outputs IR,R and N, is used if the logical buffering unit is designed according to the embodiments of FIGS. 4 and 5.

The mentioned logical buffering unit LBU is arranged to process the decoded insertion reference and to control the addressing of the memory so that the actual insertion instruction will be decoded immediately after the insertion reference and the first instruction of the second sequence part is decoded immediately after the insertion instruction.

In all embodiments of the logical buffering unit LBU, shown by FIGS. 2 to 5, a first address switch is included comprising two gate devices G5 and G6. This switch is connected to the terminal pair TP2 of the memory M and has its output belonging to the two gate devices G5 and G6 connected to an input of gate device G2, its first input belonging to the gate device G5 connected to the +1-adder ADD and its second input belonging to the gate device G6 connected to the mentioned outputs N of the second decoder. In the embodiments according to FIGS. 2, 3 and 4 the connection is done directly, while according to the embodiment of FIG. 5 it is done through a gate device G7 and a buffer register BR. In the embodiments according to FIGS. 2 to 4 the gate device G5 is deactivated and the gate device G6 is activated if the mentioned output IR of the second decoder is activated. In the embodiment according to FIG. 5 the gate devices G5, G6 and G7 are controlled by means of signals from the output IR and by means of pulses from the output $\phi1$ of the clock generator CG, as will be described below.

Furthermore a gate device G8 belongs to all the embodiments according to FIGS. 2 to 5, is connected to the help register HR and emits the contents of the register, i.e. the address t1 belonging to the actual insertion instruction. In the embodiments according to FIGS. 2, 3 and 5 the mentioned gate device G8 is activated if the output R of the second decoder DEC2 is activated. In the embodiment according to FIG. 4 the gate device G8 is connected also to the output $\phi2$ of the clock generator CG and constitutes together with a gate device G9 a second address switch, the output of which is constituted by the outputs of the gate devices G8 and G9 connected to a buffer register BR. The gate device G9, which is deactivated at the same time as the gate device G5, has its input connected through one of the terminals of the pair TP1 to the gate device G1 of the memory. In the embodiments according to FIGS. 2 and 3 the output of the gate device G8 is connected to the second input of the first address switch. In the embodiment according to FIG. 5 the output of the gate device G8 is connected to the output of the first address switch.

Figures 2, 3:
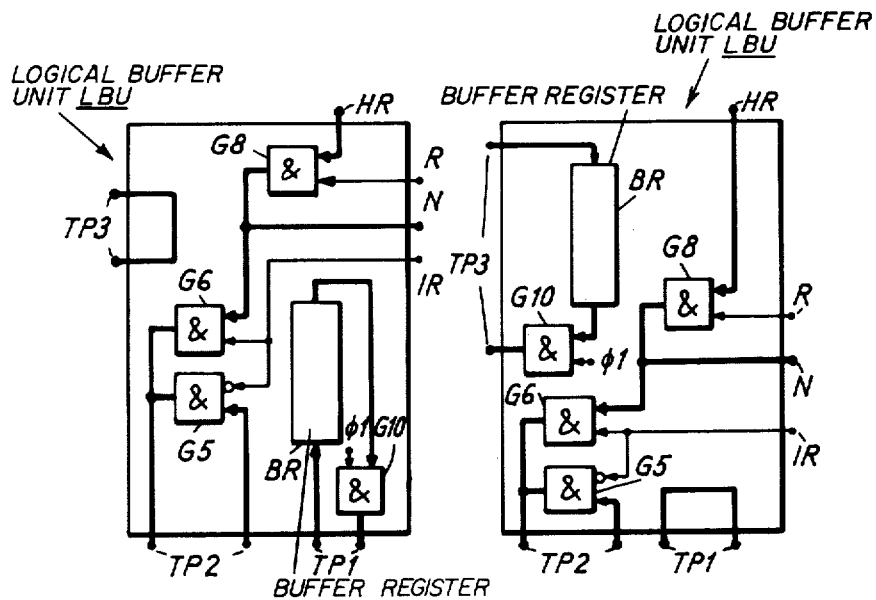
FIG. 2 shows one embodiment of the logical buffering unit of FIG. 1.
FIG. 3 shows another embodiment of the logical buffering unit of FIG. 2.

The logical buffering units LBU according to FIGS. 2 and 3 are provided with a buffer register BR whose output is connected to a gate device G10 which is activated by means of the pulse series from the output $\phi1$ of the clock generator. In the embodiment according to FIGS. 2 and 3, the buffer register BR and gate device G10 are connected to the terminal pair TP1 and TP3 of the memory, respectively. Also the buffer register BR shown in FIG. 4 has its output connected to such a gate device G10 whose output is connected to a terminal of the pair TP1. The mentioned terminal pair TP1; TP3; TP1 and TP3 are short-circuited in the embodiments according to FIG. 3; FIGS. 2 and 4; and FIG. 5, respectively.

Figure 6:
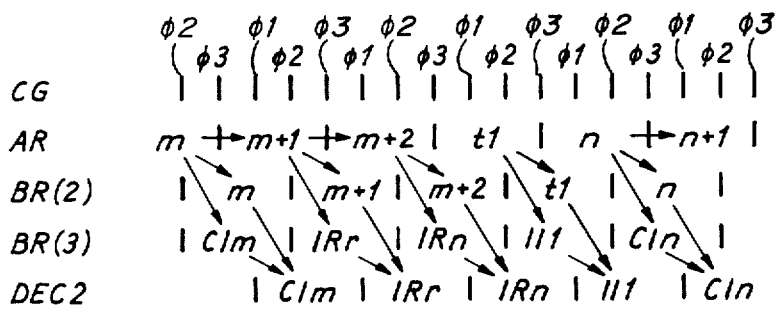

The buffer registers BR which are shown in FIGS. 2 and 3 and the reading of which is controlled by means of the $\phi1$ pulse series of the clock generator CG, are arranged to step the contents of the address register AR to, for example, m+2 by means of the $\phi3$ pulse from the clock generator. This pulse occurs during that clock pulse period demarcated by two successive $\phi1$ pulses and used for decoding the control instruction CIm associated with address number m. By means of the $\phi2$ pulse, occurring during the same clock pulse period, the address number m+1 and the binary word IRr being accessed by means of the address m+1 is transferred to the buffer register of the embodiment according to FIG. 2 and FIG. 3, respectively. A time diagram for such an addressing/decoding process is shown in FIG. 6 whose reference characters BR(2) and BR(3) refer to the buffer register in FIG. 2 and FIG. 3, respectively. The time diagram according to FIG. 6 furthermore shows that the decoding of the insertion reference IRr and IRn results in that the address register AR is not fed from the +1-adder ADD but from the help register HR with the address number t1 and from the outputs N of the second decoder DEC2 with the address number n, respectively. The result is that the actual insertion instruction II1 is decoded immediately after the insertion reference, that the +1-adder is reconnected through the gate device G5 during the decoding of the insertion instruction to the address register whose contents thus are stepped from n to n+1, and that the second instruction sequence part, i.e. the control instructions CIn to CIq, is executed after the insertion instruction II1.

Figure 7:
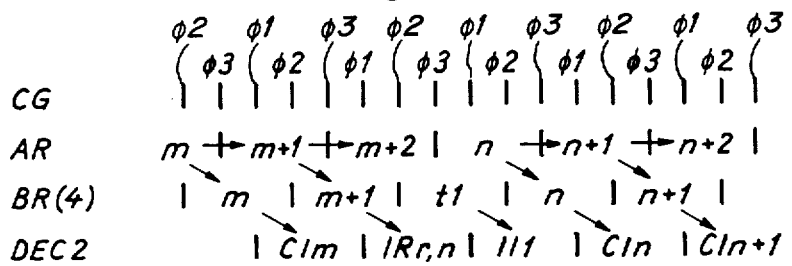

The buffer register of the logical buffering unit LBU according to FIG. 4 for executing insertion references IRr,n, which are stored in one single memory element group with for example the associated address m+1, is also used for storing addresses so that the contents of the address register are stepped from, for example, m+1 to m+2 during the decoding of the instruction CIm. This is shown in a time diagram according to FIG. 7, which until the decoding of the insertion reference is in accordance with the time diagram, for the embodiment according to FIG. 2. The decoding of the insertion references IRr,n, however, activates the outputs IR, R and N of the second decoder. Thus in FIG. 7 it is shown that the buffer register BR(4) obtains, by means of a ϕ2 pulse, the address number t1 through the gate device G8 and that the address register obtains, by means of a ϕ3 pulse, the address number n through the gate devices G6 and G2. Thus it is possible that the actual insertion instruction II1 and the second part of the instruction sequence are executed in the manner described by means of FIGS. 2 and 6.

The logical buffering unit according to FIG. 5 in still another embodiment executes insertion references IRr,n which are stored in one single memory element group. In this embodiment the buffer register BR is used to record, via the gate device G7, the initiation address n of the second sequence part which is obtained from the second decoder DEC2. FIG. 8 shows in an associated time diagram that the mentioned recording is controlled by means of that ϕ1-pulse from the clock generator CG which occurs during that clock pulse period used for decoding the insertion reference. The connection of the +1-adder ADD to the address register AR through the gate device G5 is prevented in this case not only by means of the second decoder output IR being activated during this clock pulse period, but the gate device G5 is deactivated until the first ϕ1-pulse after the end of this clock pulse period. The prolonged locking period is achieved according to FIG. 5 by means of an OR-gate G11 and a second flip-flop FF2 whose output is activated and deactivated by means of AND-gates G12 and G13, respectively. The AND-gate G13 transfers the ϕ1 pulse series of the clock generator with the exception of the mentioned ϕ1-pulse during the decoding of the insertion reference, which pulse is transferred by means of the AND-gate G12. The mentioned OR-gate G11 has its inputs connected to the output IR of the second decoder and to the output of the second flip-flop FF2 which in this embodiment also controls the gate device G6 of the first address switch. FIG. 8 shows that the address register AR receives, through the gate device G8 and by means of the ϕ3-pulse which occurs during the decoding of the insertion reference, the address t1 being stored in the help register, and it receives, through the gate device G6 and by means of the first ϕ3-pulse after the decoding of the insertion reference, the address n being stored in the buffer register. In the same way as by means of the embodiments according to the FIGS. 2 to 4, also by means of the embodiment according to FIG. 5, the first control instruction CIn of the second sequence part is decoded in that clock pulse period which is subsequent to the decoding of the insertion instruction which itself is subsequent to the decoding of the insertion reference.

The principle of the invention has until now been described by means of a logical buffering unit LBU which is separated from the memory. It is, however, evident for a man skilled in the art that such a unit very well can be combined with the addressing/decoding circuits of the memory. The mentioned buffer register can in such case be made of a delay circuit or be part of a shift register. If the operating times of the components are figured into the addressing/decoding process, then the necessary numbers of gate devices and of pulse series from the clock generator can be reduced.

I claim:

1. In a stored program controlled equipment having an operating device to be controlled, a clock pulse generator for generating sequences of timing pulses wherein adjacent timing pulses within one of the sequences establishes the clock pulse period of the equipment, an addressed memory means having an address input, an instruction output and a plurality of addressed memory element groups for storing control instructions which are read in responsive to received addresses, an address generator means having an input means and an output means and being response to said timing pulses for sequentially generating said addresses of the memory element groups to be read, and an instruction decoder means having an input and a plurality of outputs for generating control signals, apparatus for introducing one of a plurality of insertion instructions at a point in the sequence of control instructions, said apparatus comprising:

a first memory element group in the memory means for storing the insertion instruction; means for storing the address of said first memory element group; and a logical buffer unit, said logical buffer unit comprising a logical switching means having first and second address inputs for receiving addresses, an output for transmitting the address received by one of the address inputs, and a control input for controlling which of the received addresses is transmitted, a buffer register means having an input for receiving information including at least the address of an instruction and an output for transmitting therefrom after a one-clock pulse period the information received at its input, means for connecting the output of said logical switching means to the input means of said address generator means, means for connecting the output means of said address generator means to the first address input of said logical switching means, means for connecting an output of the instruction decoder means to the control input of said logical switching means, means for connecting an output of the instruction decoder means to the second address input of said logical switching means, means for connecting the output means of said address generator means to the address input of the addressed memory means, means for connecting the instruction output of the addressed memory means to the input of said buffer register means, means for connecting the output of said buffer register means to the input of the instruction decoder means, controlled gating means having a control input for connecting said means for storing the address of said first memory element group to the second address input of said logical switching means, and means for connecting an output of the instruction decoder means to the control input of said controlled gating means; a second memory element group having an address at said point in the sequence of control instructions, said second memory element group storing first indicia for indicating that an insertion reference is to be performed and second indicia for indicating that the address of said first memory element group should be fetched; and a third memory element group having the next address after the point, said third memory element group storing said first indicia and third indicia for indicating the address of the next control instruction in the sequence; said decoder means decoding said first indicia to a signal fed to the control input of said logical switching means, decoding said second indicia to a signal fed to the control input of said controlled gating means, and feeding said third indicia to the second address input of said logical switching means whereby an insertion instruction is introduced into the sequence of control instructions.

2. In a stored program controlled equipment having an operating device to be controlled, a clock pulse generator for generating sequences of timing pulses wherein adjacent timing pulses within one of the sequences establishes the clock pulse period of the equipment, an addressed memory means having an address input, an instruction output and a plurality of addressed memory element groups for storing control instructions which are read in response to received addresses, an address generator means having an input means and an output means and being responsive to said timing pulses for sequentially generating the addresses of the memory element groups to be read, and an instruction decoder means having an input and a plurality of outputs for generating control signals, apparatus for introducing one of a plurality of insertion instructions at a point in the sequence of control instructions, said apparatus comprising:

a first memory element group in the memory means for storing the insertion instruction; means for storing the address of said first memory element group; and a logical buffer unit, said logical buffer unit comprising a logical switching means having first and second address inputs for receiving addresses, an output for transmitting the address received by one of the address inputs, and a control input for controlling which of the received addresses is transmitted, a buffer register means having an input for receiving information including at least the address of an instruction and an output for transmitting therefrom after a one-clock pulse period the information received at its input, means for connecting the output of said logical switching means to the input means of said address generator means, means for connecting the output means of said address generator means to the first address input of said logical switching means, means for connecting an output of the decoder means to the control input of said logical switching means, means for connecting an output of said instruction decoder means to the second address input of said logical switching means, means for connecting the output means of said address generator means to the input of said buffer register means, means for connecting the output of said buffer register means to the address input of the addressed memory means, means for connecting the instruction output of said addressed memory means to the input of the instruction decoder means, controlled gating means having a control input for connecting said means for storing the address of said first memory element group to the second address input of said logical switching means, and means for connecting an output of the instruction decoder means to the control input of said controlled gating means; a second memory element group having an address at said point in the sequence of control instructions, said second memory element group storing first indicia for indicating that an insertion reference is to be performed and second indicia for indicating that the address of said first memory element group should be fetched; and a third memory element group having the next address after the point, said third memory element group storing said first indicia and third indicia for indicating the address of the next control instruction in the sequence; said decoder means decoding said first indicia to a signal fed to the control input of said logical switching means, decoding said second indicia to a signal fed to the control input of said controlled gating means, and feeding said third indicia to the second address input of said logical switching means whereby an insertion instruction is introduced into the sequence of control instructions.

3. In a stored program controlled equipment having an operating device to be controlled, a clock pulse generator for generating sequences of timing pulses wherein adjacent timing pulses within one of the sequences establishes the clock pulse period of the equipment, an addressed memory means having an address input, an instruction output and a plurality of addressed memory element groups for storing control instructions which are read in response to received addresses, an address generator means having an input means and an output means and being responsive to said timing pulses for sequentially generating the addresses of the memory element groups to be read, and an instruction decoder means having an input and a plurality of outputs for generating control signals, apparatus for introducing one of a plurality of insertion instructions at a point in the sequence of control instructions, said apparatus comprising:

a first memory element group in the memory means for storing the insertion instruction; means for storing the address of said first memory element group; and a logical buffer unit, said logical buffer unit comprising a logical switching means having first and second address inputs for receiving addresses, an output for transmitting the address received by one of the address inputs, and a control input for controlling which of the received addresses is transmitted, a buffer register means having an input for receiving information including at least the address of an instruction and an output for transmitting therefrom after a one-clock pulse period the information received at its input, means for connecting the output of said logical switching means to the input means of said address generator means, means for connecting the output means of said address generator means to the first address input of said logical switching means, means for connecting an output of the decoder means to the control input of said logical switching means, means for connecting an output of said decoder means to the second address input of said logical switching means, means for connecting the output means of said address generator means to the input of said buffer register means, means for connecting the output of said buffer register means to the address input of the addressed memory means, means for connecting the instruction output of the addressed memory means to the input of the instruction decoder means, controlled gating means having a control input for connecting said means for storing the address of said first memory element group to the input of said buffer register means, means for connecting an output of the instruction decoder means to the control input of said controlled gating means; and a second memory element group having an address at said point in the sequence of control instructions, said second memory element group storing an insertion reference instruction including first indicia for indicating that an insertion reference is to be performed, second indicia for indicating that the address of said first memory element group should be fetched, and third indicia for indicating the address of the next control instruction in the sequence; said decoder means decoding said first indicia to a signal fed to the control input of said logical switching means, decoding said second indicia to a signal fed to the control input of said controlled gating means, and feeding said third indicia to the second address input of said logical switching means whereby an insertion instruction is introduced into the sequence of control instructions.

4. In a stored program controlled equipment having an operating device to be controlled, a clock pulse generator for generating sequences of timing pulses wherein adjacent timing pulses within one of the sequences establishes the clock pulse period of the equipment, an addressed memory means having an address input, an instruction output and a plurality of addressed memory element groups for storing control instructions which are read in response to received addresses, an address generator means having an input means and an output means and being responsive to said timing pulses for sequentially generating the addresses of the memory element groups to be read, and an instruction decoder means having an input and a plurality of outputs for generating control signals, apparatus for introducing one of a plurality of insertion instructions at a point in the sequence of control instructions, said apparatus comprising:

a first memory element group in the memory means for storing the insertion instruction; means for storing the address of said first memory element group; and a logical buffer unit, said logical buffer unit comprising a logical switching means having first and second address inputs for receiving addresses, an output for transmitting the address received by one of the address inputs, and a control input for controlling which of the received addresses is transmitted, a buffer register means having an input for receiving information including at least the address of an instruction and an output for transmitting therefrom after a one-clock pulse period the information received at its input, means for connecting the output of said logical switching means to the input means of said address generator means, means for connecting the output means of said address generator means to the first address input of said logical switching means, means for connecting an output of the decoder means to the control input of said logical switching means, means for connecting an output of the instruction decoder means to the input of said buffer register means, means for connecting the output of said buffer register means to the second address input of said logical switching means, means for connecting the output means of said address generator means to the input of said address generator means, means for connecting the instruction output of the addressed memory means to the input of the instruction decoder means, controlled gating means having a control input for connecting said means for storing the address of said first memory element group to the input of the address generator means, means for connecting an output of the instruction decoder means to the control input of said controlled gating means; and a second memory element group having an address at said point in the sequence of control instructions, said second memory element group storing an insertion reference instruction including first indicia for indicating that an insertion reference is to be performed, second indicia for indicating that the address of said first memory element group should be fetched, and third indicia for indicating the address of the next control instruction in the sequence; said instruction decoder means decoding said first indicia to a signal fed to the control input of said first logical switching means, decoding said second indicia to a signal fed to the control input of said controlled gating means, and feeding said third indicia to the second address input of said logical switching means whereby an insertion instruction is introduced into the sequence of control instructions.

* * * * *